UNITED STATES PATENT OFFICE.

PHILIP HAVILL AND DAVID CURRAN, OF ROSCOE, OHIO.

IMPROVEMENT IN TANNERS' FLESH-BLACKING.

Specification forming part of Letters Patent No. 3,144, dated June 24, 1843.

*To all whom it may concern:*

Be it known that we, PHILIP HAVILL and DAVID CURRAN, of Roscoe, Coshocton county, and State of Ohio, have invented a new and Improved Mode of Making Tanners' Flesh-Blacking, to be used in blacking the flesh side of leather; and we do hereby declare that the following is a full and exact description thereof.

To make one gallon of Havill & Curran's tanners' flesh-blacking, take of gum-tragacanth four ounces, softened in a half-pint of warm water and beat to the consistency of starch; then take of whisky three gills, and of vinegar one gill, spirits of turpentine two tea-spoonfuls, and of superior lamp-black five ounces. Mix thoroughly together. Then take of oak-bark about a pound and a half, black oak and quercitron being the best; of iron filings from one to one and a half ounce—or, equally well, of clean scales from the blacksmith's anvil, from one-fourth to half a pound—and water one gallon. Boil the whole together for half an hour; then strain and add hot water sufficient to make the quantity of the decoction within one pint of a gallon. Lastly, while the above decoction is hot, add the solutions of tragacanth and lamp-black before mentioned. Stir well together, and when cool it is fit for use in the same manner and mode in which the common blacking is used by good mechanics. With the exception of the lamp-black, neither of the above-named ingredients have, as we believe, entered into the composition of tanners' flesh-blacking, nor has any compound been so used possessing the same good properties.

We therefore claim as of our invention and desire to secure by Letters Patent—

The combining of these ingredients in the manner and in the proportions above made known, or nearly in said proportions, for the purpose of making or manufacturing tanners' flesh-blacking, which tanners' flesh-blacking, when made of said materials, we denominate "Havill & Curran's Tanners' Flesh-Blacking."

P. HAVILL.
          DAVID CURRAN.

Attest:
  G. R. LITTLE,
  J. S. FERGUSON.